(12) United States Patent
Kamiyama et al.

(10) Patent No.: US 12,202,273 B2
(45) Date of Patent: Jan. 21, 2025

(54) LIQUID EJECTION DEVICE WITH EJECTION-FAILURE DETECTION

(71) Applicant: SEIKO EPSON CORPORATION, Tokyo (JP)

(72) Inventors: Nobuaki Kamiyama, Matsumoto (JP); Junpei Yamashita, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 18/050,813

(22) Filed: Oct. 28, 2022

(65) Prior Publication Data

US 2023/0140394 A1 May 4, 2023

(30) Foreign Application Priority Data

Oct. 29, 2021 (JP) .................................. 2021-177281

(51) Int. Cl.
*G06F 3/12* (2006.01)
*B41J 2/21* (2006.01)

(52) U.S. Cl.
CPC ............ *B41J 2/2142* (2013.01); *G06F 3/121* (2013.01); *G06F 3/1234* (2013.01)

(58) Field of Classification Search
CPC ........ B41J 2/2142; G06F 3/121; G06F 3/1234
USPC ....... 358/1.14, 502; 347/5, 9, 14, 19, 20, 22, 347/27
See application file for complete search history.

(56) References Cited

U.S. PATENT DOCUMENTS

| | | | |
|---|---|---|---|
| 2017/0259561 A1* | 9/2017 | Takano | B41J 3/46 |
| 2018/0250938 A1* | 9/2018 | Kawakami | B41J 2/16517 |
| 2019/0291412 A1* | 9/2019 | Tsuchihashi | B41J 2/0451 |
| 2020/0164632 A1 | 5/2020 | Kamiyanagi et al. | |
| 2020/0361210 A1* | 11/2020 | Sato | G06N 3/084 |
| 2021/0086503 A1* | 3/2021 | Aoyagi | B41J 2/16547 |

FOREIGN PATENT DOCUMENTS

JP 2020082475 A 6/2020

\* cited by examiner

*Primary Examiner* — Jamares Q Washington
(74) *Attorney, Agent, or Firm* — CHIP Law Group (57) ABSTRACT

A liquid ejecting device includes: a liquid ejecting head configured to eject a liquid from a plurality of nozzles to perform printing; an imaging unit configured to image a nozzle surface at which the plurality of nozzles are provided; an ejection-failure detecting unit configured to detect whether the plurality of nozzles have an ejection failure; a maintenance unit configured to perform maintenance of the liquid ejecting head; a notification unit configured to perform notification; and a control unit, in which, when the ejection-failure detecting unit detects the ejection failure, the control unit causes the imaging unit to image a nozzle for which the ejection failure is detected, infers a cause of the ejection failure based on a result of the imaging, and performs at least one of the maintenance and the notification based on the inferred cause.

12 Claims, 5 Drawing Sheets

LIQUID EJECTION DEVICE WITH EJECTION-FAILURE DETECTION

The present application is based on, and claims priority from JP Application Serial Number 2021-177281, filed on Oct. 29, 2021, the disclosure of which is hereby incorporated by reference herein in its entirety.

BACKGROUND

1. Technical Field

The present disclosure relates to a liquid ejecting device such as a printer.

2. Related Art

For example, as in JP-A-2020-82475, there is a liquid ejecting device that ejects ink serving as one example of a liquid from a liquid ejecting head to perform printing. The liquid ejecting head causes a vibrating plate to be displaced to eject the ink from a nozzle. The displaced vibrating plate performs damped oscillation. This damped oscillation is also called residual vibration. In a case of the residual vibration, a damping ratio of frequency and amplitude varies when an abnormality of ejection occurs. The liquid ejecting device includes an ejection-abnormality detecting circuit serving as one example of an ejection-failure detecting unit configured to identify a cause of an ejection failure on the basis of the residual vibration.

In a case of JP-A-2020-82475, identification is made on the basis of residual vibration as to whether the cause of the ejection failure is the presence of air bubbles, or an increase in the viscosity of a liquid, or attachment of foreign substance. However, the cause may be difficult to be identified in some cases such as when foreign substances are attached, for example. When the cause of the ejection failure cannot be identified, it is difficult to deal with the failure in an appropriate manner.

SUMMARY

The liquid ejecting device that solves the problem described above includes a liquid ejecting head configured to eject a liquid from a plurality of nozzles to perform printing, a camera configured to image a nozzle surface at which the plurality of nozzles are provided, an ejection-failure detecting unit configured to detect whether the plurality of nozzles have an ejection failure, a maintenance unit configured to perform maintenance of the liquid ejecting head, a notification unit configured to perform notification, and a control unit, in which, when the ejection-failure detecting unit detects the ejection failure, the control unit causes the camera to image a nozzle in which the ejection failure is detected, infers a cause of the ejection failure based on a result of the imaging, and causes at least one of the maintenance and the notification to be performed based on the inferred cause.

DESCRIPTION OF EXEMPLARY EMBODIMENTS

Embodiments

Liquid Ejecting Device

Below, an embodiment of a liquid ejecting device will be described with reference to the drawings. For example, the liquid ejecting device is an ink jet-type printer configured to eject ink serving as one example of a liquid onto a medium such as a sheet, fiber, vinyl, a plastic component, a metal component, to perform printing.

In the drawings, on the assumption that a liquid ejecting device 11 is placed on a horizontal surface, the direction of gravity is illustrated as the Z-axis, and directions along the horizontal surface are illustrated by the X-axis and the Y-axis. The X-axis, the Y-axis, and the Z-axis are perpendicular to each other. In the following description, a direction parallel to the X-axis is also referred to as a scanning direction X.

Figure 1:
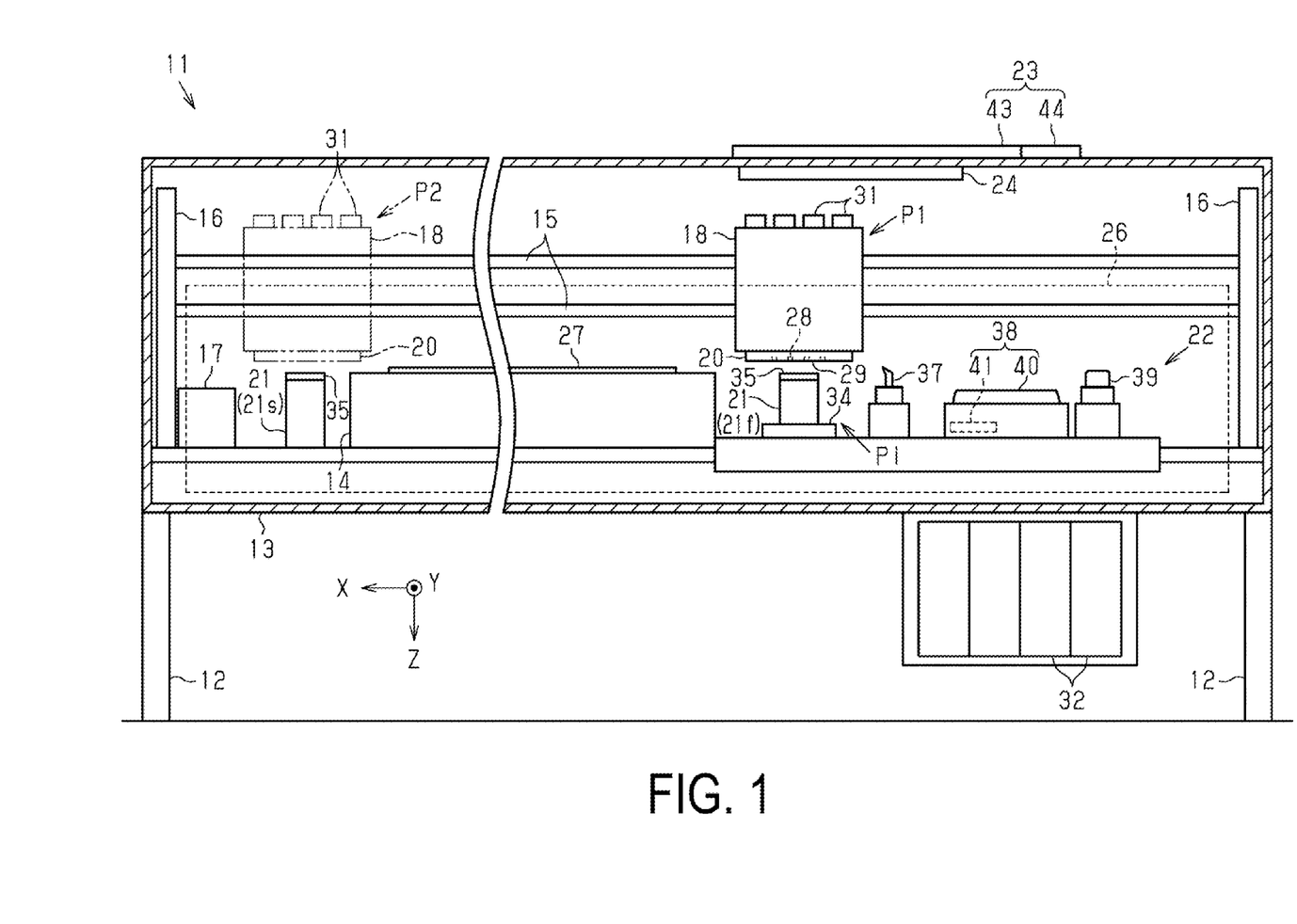
FIG. 1 is a schematic view illustrating an embodiment of a liquid ejecting device.

As illustrated in FIG. 1, the liquid ejecting device 11 may include a supporting leg portion 12, an outer case 13, a support 14, a guide shaft 15, a supporting mechanism 16, a driving mechanism 17, and a carriage 18. The liquid ejecting device 11 includes a liquid ejecting head 20, a camera 21, a maintenance unit 22, a notification unit 23, and a control unit 24.

The supporting leg portion 12 supports the outer case 13. The liquid ejecting device 11 may include one or more supporting leg portions 12.

The outer case 13 may include an opening/closing section 26 configured to enable access to the inside thereof. By opening the opening/closing section 26, a user can perform maintenance within the liquid ejecting device 11, which includes cleaning of the liquid ejecting head 20 or replacement of the liquid ejecting head 20.

The support 14 supports a medium 27. The medium 27 is transported on the support 14 in a transport direction by a transport unit that is not illustrated. In the present embodiment, the transport direction is a direction parallel to the Y-axis. After printing is performed on the support 14, the medium 27 is discharged outside of the outer case 13.

The liquid ejecting device 11 may include one or more guide shafts 15. In the present embodiment, the guide shaft 15 extends along the X-axis. The guide shaft 15 guides movement of the carriage 18.

The supporting mechanism 16 supports the guide shaft 15. The supporting mechanism 16 may support the guide shaft 15 so as to be able to ascend and descend.

The carriage 18 holds the liquid ejecting head 20. The carriage 18 reciprocates along the guide shaft 15 with drive of the driving mechanism 17. That is, the carriage 18 moves the liquid ejecting head 20 along the guide shaft 15 toward the scanning direction X and a direction opposite to the scanning direction X. In other words, the liquid ejecting head 20 is able to move in the scanning direction X.

The liquid ejecting head 20 ejects a liquid from a plurality of nozzles 28 to perform printing. The liquid ejecting head 20 includes a nozzle surface 29 at which the plurality of nozzles 28 are provided. In the present embodiment, the liquid ejecting head 20 discharges a liquid while moving, to perform printing on the medium 27 supported at the support 14.

The carriage 18 holds one or more first liquid accommodating bodies 31. A plurality of first liquid accommodating bodies 31 may individually accommodate different types of liquids. The different types of liquids are, for example, inks having different colors. The first liquid accommodating bodies 31 may be configured to be supplied with liquids from another second liquid accommodating body 32 through a supply tube that is not illustrated. The number of second liquid accommodating bodies 32 provided may be the same number of first liquid accommodating bodies 31, for example.

Each of the first liquid accommodating bodies 31 and the second liquid accommodating body 32 is, for example, a tank, a cartridge, or a pack configured to accommodate the liquid. The first liquid accommodating bodies 31 and the second liquid accommodating body 32 may be the same item or may be different items. The first liquid accommodating bodies 31 may be configured to be attached to the carriage 18 in a detachable manner. The second liquid accommodating body 32 is disposed inside of or outside of the outer case 13. The second liquid accommodating body 32 may be attached in a detachable manner.

The liquid ejecting device 11 may include one or more cameras 21. In the present embodiment, the liquid ejecting device 11 includes two cameras 21. In the present embodiment, one of the cameras 21 is also referred to as a first camera 21f, and the other one of the cameras 21 is referred to as a second camera 21s. The first camera 21f and the second camera 21s are provided with the support 14 being interposed between them in the scanning direction X.

Each of the cameras 21 is able to image the nozzle surface 29. That is, the first camera 21f is able to image the nozzle surface 29 of the liquid ejecting head 20 located at a first image-capturing position P1 indicated by the solid line in FIG. 1. The second camera 21s is able to image the nozzle surface 29 of the liquid ejecting head 20 located at a second image-capturing position P2 indicated by the long dashed double-short dashed line in FIG. 1.

The liquid ejecting device 11 may include a movement unit 34 configured to move the camera 21. The movement unit 34 may move at least one camera 21 of the plurality of cameras 21. In the present embodiment, the movement unit 34 moves the first camera 21f. The movement unit 34 is able to move the first camera 21f in a movement direction differing from the scanning direction X. The movement direction is, for example, a direction parallel to the Y-axis. The movement unit 34 moves the first camera 21f located at a standby position, which is not illustrated, in the movement direction so as to be located at an imaging position Pi. The imaging position Pi is a position where the nozzle 28 of the liquid ejecting head 20 located at the first image-capturing position P1 serving as one example of an image-capturing position is able to be imaged.

The liquid ejecting device 11 may include one or more covers 35 configured to protect the camera 21. In the present embodiment, the liquid ejecting device 11 includes two covers 35. The covers 35 may be of a fixed type or may be of a movable type.

In the present embodiment, the cover 35 configured to protect the first camera 21f is of a fixed type. Of the first camera 21f located at the standby position, the cover 35 for the first camera 21f covers at least a lens that the first camera 21f includes. As the first camera 21f is moved to the imaging position Pi, the lens is deviated from the cover 35.

In the present embodiment, the cover 35 configured to protect the second camera 21s is of a movable type. The cover 35 for the second camera 21s is able to move to a covering position where at least a lens that the second camera 21s includes is covered and an exposing position where the lens is exposed. The cover 35 for the second camera 21s may be located at the covering position during the time when the second camera 21s does not perform imaging and may move to the exposing position when the second camera 21s performs imaging.

The first camera 21f and the second camera 21s may have different imaging ranges in terms of imaging. For example, the first camera 21f may perform imaging in a manner such that a portion of the nozzle surface 29 is enlarged. For example, the second camera 21s may perform imaging the entire nozzle surface 29.

When the imaging range in the scanning direction X is a portion of the nozzle surface 29, the control unit 24 may adjust the first image-capturing position P1 and the second image-capturing position P2 such that the nozzle 28 to be imaged exists in the imaging range. That is, the first image-capturing position P1 and the second image-capturing position P2 are not limited to positions where the center, in the scanning direction X, of the liquid ejecting head 20 is immediately above the center of the camera 21, and may be positions where these centers are not aligned in the scanning direction X.

Specifically, the first image-capturing position P1 may be a position at which a given nozzle 28 can be imaged with the first camera 21f located at the imaging position Pi. The second image-capturing position P2 may be a position at which a given nozzle 28 can be imaged with the second camera 21s. The given nozzle 28 may be, for example, a nozzle 28 for which an ejection failure of the liquid ejecting head 20 is detected.

The maintenance unit 22 performs maintenance of the liquid ejecting head 20. The maintenance unit 22 may include a wiper 37, a cleaning unit 38, and a cleaning member 39. The cleaning unit 38 may include a cap 40 and a suction pump 41. In the present embodiment, the wiper 37, the cap 40, and the cleaning member 39 are individually able to move to a position where they can be in contact with the liquid ejecting head 20 and a position where they are not in contact with the liquid ejecting head 20.

The wiper 37 includes, for example, a sheet-like elastic body. The wiper 37 causes the elastic body to be brought into contact with the nozzle surface 29 of the liquid ejecting head 20 that is passing through above the wiper 37 to be able to wipe the nozzle surface 29. The maintenance in which the wiper 37 wipes the liquid ejecting head 20 is also referred to as wiping.

The cap 40 is opposed to the liquid ejecting head 20 located at a cleaning position that is not illustrated. In the present embodiment, the cleaning position is disposed immediately above the cap 40. When the cap 40 ascends in a case where the liquid ejecting head 20 is at the cleaning position, the cap 40 is brought into contact with the nozzle surface 29 so as to surround the nozzle 28. As the cap 40 is brought into contact with the liquid ejecting head 20, a closed space where the nozzle 28 is opened is formed between the cap 40 and the liquid ejecting head 20. The maintenance in which the cap 40 is brought into contact with the nozzle surface 29 so as to surround the nozzle 28 is also referred to as capping. The capping is performed to prevent the nozzle 28 from drying when the liquid ejecting device 11 is at rest or stopped.

The suction pump 41 reduces the pressure within the closed space formed by the cap 40 with the liquid ejecting head 20. This causes the liquid within the liquid ejecting head 20 to be forcibly discharged through the nozzle 28. The maintenance in which the suction pump 41 causes the liquid to be discharged is also referred to as suction cleaning. The cleaning unit 38 is able to perform the suction cleaning serving as one example of cleaning in which a liquid is forcibly discharged from the liquid ejecting head 20.

The cap 40 may accommodate the liquid ejected from the liquid ejecting head 20 located at the cleaning position. The maintenance in which the liquid is ejected from the liquid ejecting head 20 is also referred to as flushing.

The cleaning member 39 is able to clean a side surface of the liquid ejecting head 20. The cleaning member 39 may include, for example, an elastic body such as rubber. The cleaning member 39 may include an absorption body that is able to absorb a liquid.

The notification unit 23 performs notification. The notification unit 23 may include a display unit 43 that can display various types of information. The display unit 43 performs display as the notification. The display unit 43 may be a monitor or may be a touch panel at which operation can be performed. The notification unit 23 may include a speaker 44 that can produce sounds.

Figure 2:
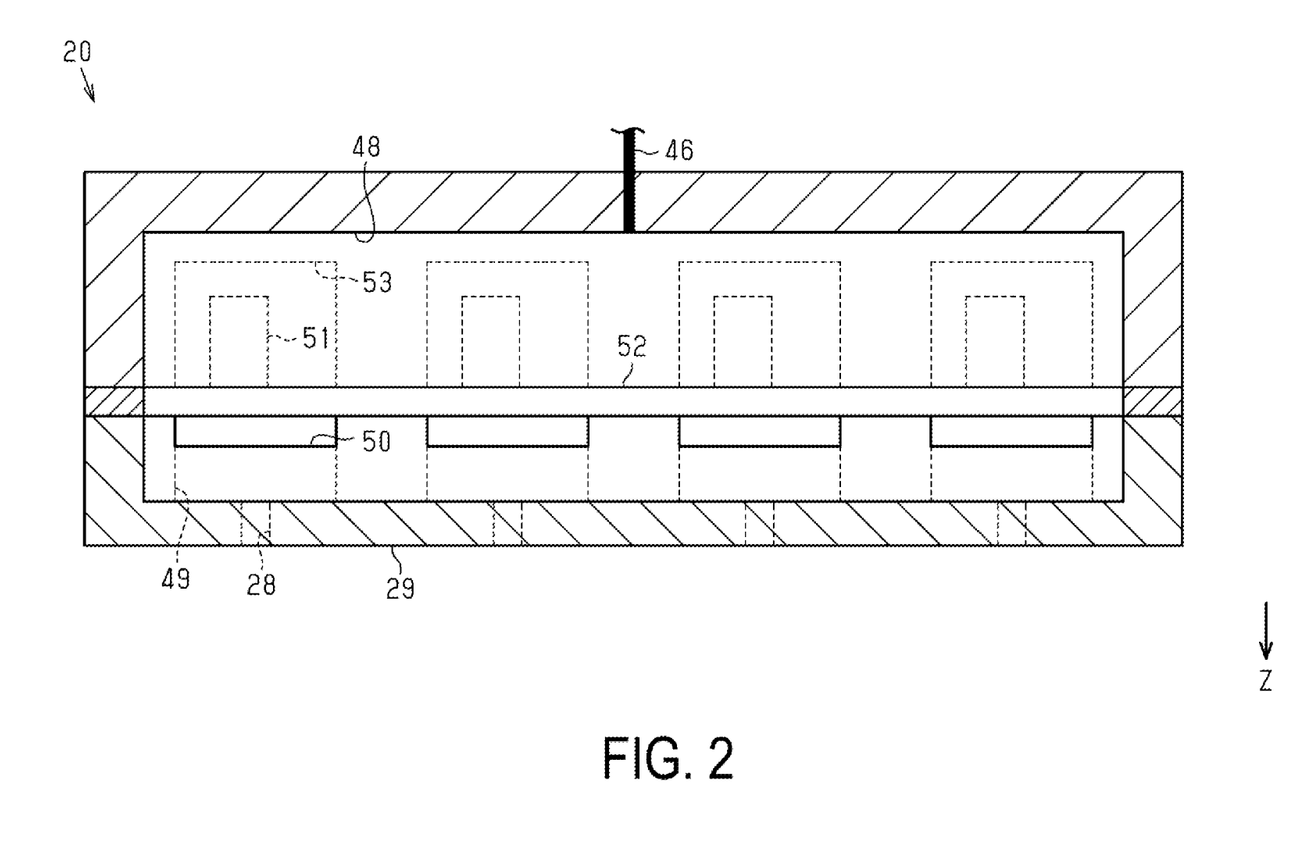
FIG. 2 is a schematic cross-sectional view illustrating a liquid ejecting head.

As illustrated in FIG. 2, the liquid ejecting device 11 may include a supply flow path 46. The supply flow path 46 couples the first liquid accommodating body 31 and the liquid ejecting head 20.

The liquid ejecting head 20 may include a shared liquid chamber 48, a plurality of pressure chambers 49, a plurality of communication paths 50, a plurality of actuators 51, a vibrating plate 52, and an accommodation chamber 53.

The supply flow path 46 is coupled to the shared liquid chamber 48. A liquid is supplied from the first liquid accommodating body 31 through the supply flow path 46 to the shared liquid chamber 48.

Each of the pressure chambers 49 communicates with the shared liquid chamber 48 through the corresponding communication path 50, and also communicates with the corresponding nozzle 28. A portion of a wall surface of the pressure chamber 49 is formed of the vibrating plate 52.

The accommodation chamber 53 is disposed at a position differing from that of the shared liquid chamber 48. The accommodation chamber 53 accommodates the actuator 51. The actuator 51 is provided at a surface of the vibrating plate 52 that is disposed at an opposite side from a portion that faces the pressure chamber 49.

In the present embodiment, the actuator 51 is formed of a piezoelectric element that contracts when a driving voltage is applied. After the vibrating plate 52 is caused to deform in association with contraction of the actuator 51 due to application of the driving voltage, the application of the driving voltage to the actuator 51 is stopped. This changes the volume of the pressure chamber 49 to eject the liquid within the pressure chamber 49 from the nozzle 28 as liquid droplets.

Figure 3:
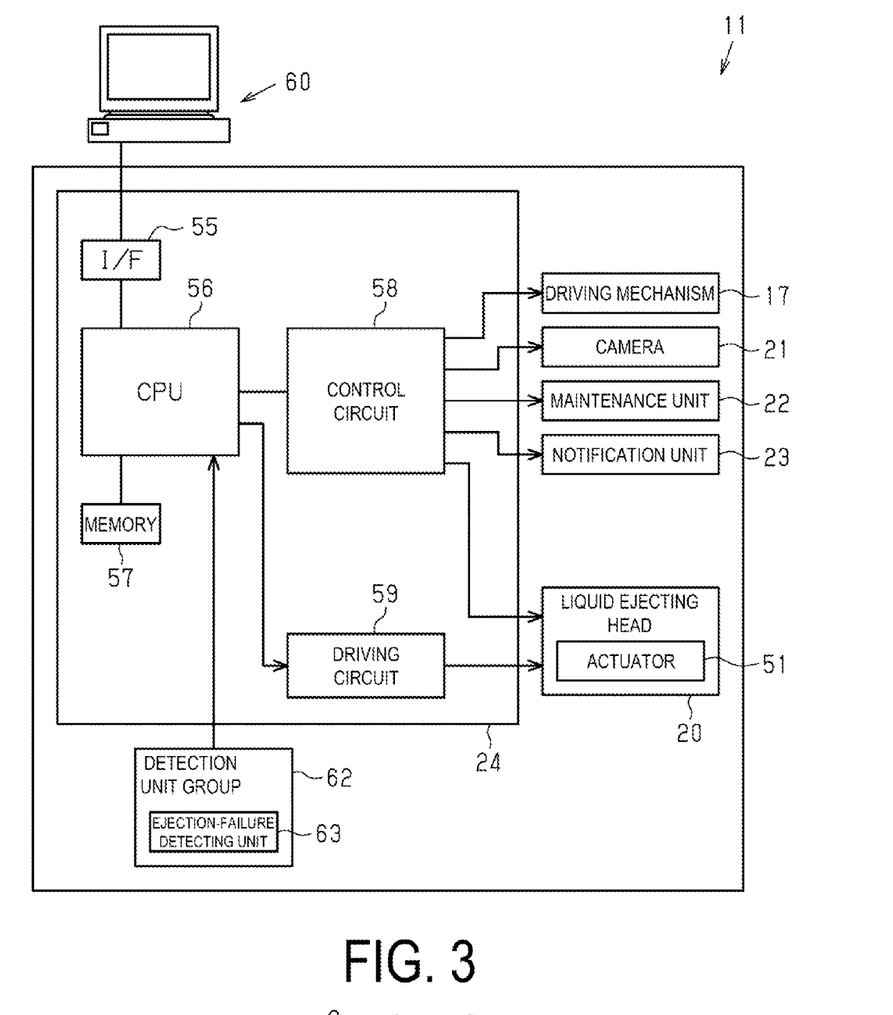
FIG. 3 is a block diagram illustrating an electrical configuration of the liquid ejecting device.

As illustrated in FIG. 3, the control unit 24 comprehensively controls constituent elements of the liquid ejecting device 11. The control unit 24 includes an interface unit 55, a CPU 56, a memory 57, a control circuit 58, and a driving circuit 59. The interface unit 55 transmits and receives data between a computer 60 serving as an external device and the liquid ejecting device 11. The driving circuit 59 generates a drive signal that causes the actuator 51 to drive.

The CPU 56 is an arithmetic processing device. The memory 57 is a storage device used to secure a region where a program for the CPU 56 is stored, a working region, or the like, and includes a storage element such as a RAM, an EEPROM, or the like. The CPU 56 controls the driving mechanism 17, the camera 21, the maintenance unit 22, the notification unit 23, the liquid ejecting head 20, and the like through the control circuit 58 in accordance with programs stored in the memory 57.

The liquid ejecting device 11 includes a detection unit group 62. The detection unit group 62 is controlled by the control unit 24. The detection unit group 62 monitors situations in the liquid ejecting device 11. The detection unit group 62 outputs results of detection to the control unit 24. The detection unit group 62 may include, for example, a linear encoder configured to detect a state of movement of the carriage 18, and a medium detection sensor configured to detect the medium 27.

The detection unit group 62 includes an ejection-failure detecting unit 63. The ejection-failure detecting unit 63 detects the presence or absence of an ejection failure at the plurality of nozzles 28. In the present embodiment, the ejection-failure detecting unit 63 is a circuit configured to detect a vibration waveform of the pressure chamber 49 to detect a state within the pressure chamber 49. The ejection-failure detecting unit 63 detects the presence or absence of an ejection failure at the plurality of nozzles 28 on the basis of the residual vibration of the vibrating plate 52 that is displaced. The ejection-failure detecting unit 63 may include a piezoelectric element that constitutes the actuator 51.

The plurality of actuators 51 are individually driven by the driving circuit 59 to partially displace the vibrating plate 52. The displaced vibrating plate 52 causes a liquid to be ejected from a nozzle 28 corresponding to the driven actuator 51.

That is, once a voltage is applied to the actuator 51 in response to a signal from the driving circuit 59, the vibrating plate 52 bends and is deformed. This varies a pressure within the pressure chamber 49. This variation causes the vibrating plate 52 to vibrate for a while. This vibration is called residual vibration. Detecting a state of the pressure chamber 49 and a state of the nozzle 28 communicating with the pressure chamber 49 on the basis of the state of the residual vibration is called nozzle inspection.

Figure 4:
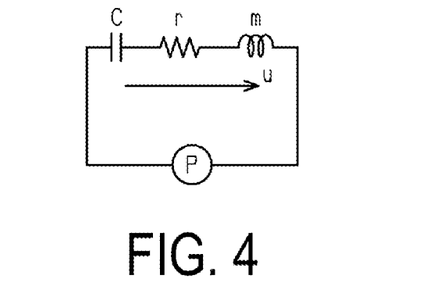
FIG. 4 is a diagram illustrating a calculation model for simple harmonic motion representing residual vibration of a vibrating plate.

FIG. 4 is a diagram illustrating a calculation model for simple harmonic motion representing the residual vibration of the vibrating plate 52.

As the driving circuit 59 applies a drive signal to the actuator 51, the actuator 51 expands and contracts in accordance with the voltage of the drive signal. The vibrating plate 52 is flexed in response to expansion and contraction of the actuator 51. This causes the volume of the pressure chamber 49 to expand and then contract. At this time, due to the pressure occurring within the pressure chamber 49, a portion of the liquid that exists in the pressure chamber 49 is ejected from the nozzle 28 as liquid droplets.

During the series of operations of the vibrating plate 52 described above, the vibrating plate 52 performs free oscillation at a natural oscillation frequency determined by: a flow path resistance r determined by the shape of a flow path in which a liquid flows, the viscosity of the liquid, and the like; an inertance m due to the weight of the liquid in the flow path; and a compliance C of the vibrating plate 52. This free oscillation of the vibrating plate 52 is the residual vibration.

The calculation model for the residual vibration of the vibrating plate 52 illustrated in FIG. 4 can be expressed by using a pressure P, the inertance m, the compliance C, and the flow path resistance r described above. The step response at the time of applying the pressure P to the circuit in FIG. 4 is calculated in terms of the volume velocity u. This makes it possible to obtain the following equation.

[Mathematical Equation 1]

$$u = \frac{P}{\omega \cdot m} e^{-\omega t} \cdot \sin\omega t \quad (1)$$

$$\omega = \sqrt{\frac{1}{m \cdot C} - \alpha^2} \quad (2)$$

$$\alpha = \frac{r}{2m} \quad (3)$$

Figure 5:
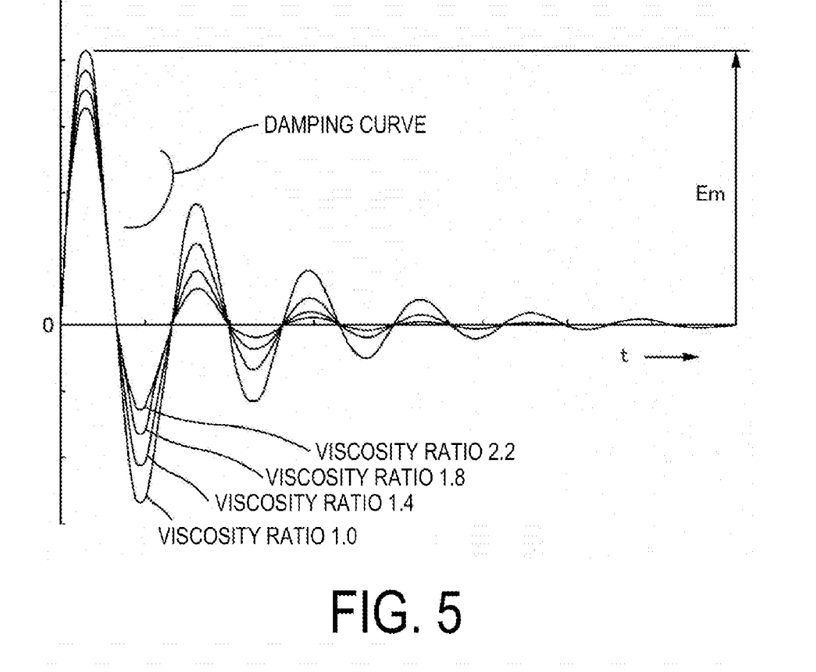
FIG. 5 is an explanatory diagram used to explain a relationship between an increase in the viscosity of a liquid and waveforms of the residual vibration.

FIG. 5 is an explanatory diagram illustrating a relationship between an increase in the viscosity of the liquid and the waveform of the residual vibration. In FIG. 5, the horizontal axis indicates time, and the vertical axis indicates the magnitude of the residual vibration. For example, when the liquid at and around the nozzle 28 dries, the viscosity of the liquid increases, that is, the increased viscosity. When the viscosity of the liquid increases, the flow path resistance r increases, which leads to an increase in the oscillation cycle and the damping of the residual vibration.

Figure 6:
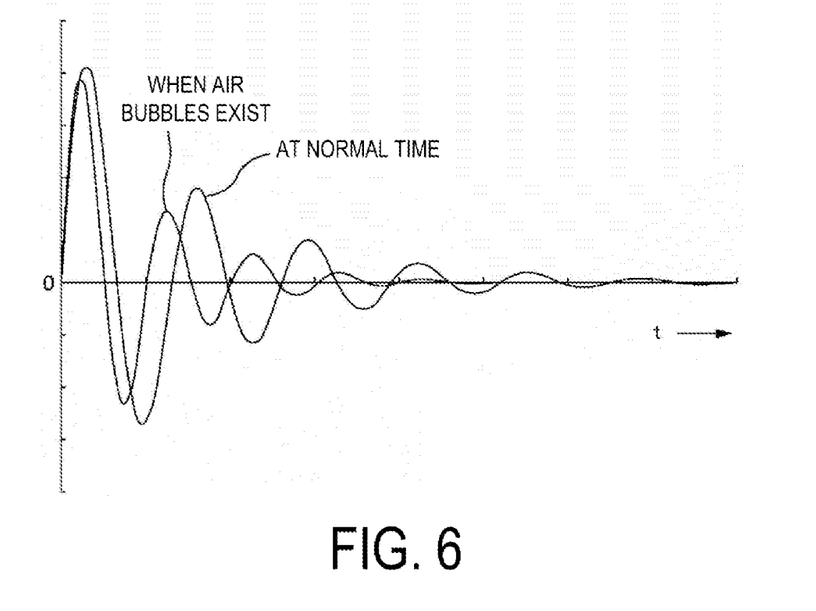
FIG. 6 is an explanatory diagram used to explain a relationship between the existence of air bubbles and a waveform of the residual vibration.

FIG. 6 is an explanatory diagram illustrating a relationship between the existence of air bubbles and a waveform of the residual vibration. In FIG. 6, the horizontal axis indicates time, and the vertical axis indicates the magnitude of the residual vibration. For example, when air bubbles enter the flow path for the liquid or the tip of the nozzle 28, the inertance m that is the weight of the liquid reduces by the amount of the existence of air bubbles, as compared with a case when the state of the nozzle 28 is normal. From Equation (2), as the "m" reduces, the angular velocity co increases, which results in a reduction in the oscillation cycle. That is, the oscillation frequency increases.

In addition, when foreign substances such as paper dust adhere at and around the opening of the nozzle 28, the amount of the liquid in the pressure chamber 49 and the seeping liquid as viewed from the vibrating plate 52 increases as compared with the normal state. It is considered that this increase causes an increase in the inertance m. It is considered that fiber of paper dust attached at and around the outlet of the nozzle 28 causes an increase in the flow path resistance r. Thus, when paper dust is attached at and around the opening of the nozzle 28, the frequency reduces as compared with the normal ejection, and the frequency of the residual vibration increases as compared with the frequency when the viscosity of the liquid increases.

When the viscosity of the liquid increases or an air bubble exists or foreign substances adhere or the like, the state of the nozzle 28 and the inside of the pressure chamber 49 becomes abnormal. This typically results in a fact that a liquid is not ejected from the nozzle 28. This causes a missing dot to occur in an image recorded on the medium 27. Even when liquid droplets are ejected from the nozzle 28, the amount of the liquid droplets may be small, or the direction of fly of the liquid droplets may be deviated and the liquid droplets may not land on the targeted location. A nozzle 28 having such an ejection failure is also referred to as an abnormal nozzle.

In this manner, the residual vibration of the pressure chamber 49 communicating with the abnormal nozzle differs from the residual vibration of the pressure chamber 49 communicating with a normal nozzle 28. Thus, the ejection-failure detecting unit 63 detects a vibration waveform of the pressure chamber 49 to detect the state of the inside of the pressure chamber 49.

The ejection-failure detecting unit 63 may infer whether the state within the pressure chamber 49 is normal or abnormal, on the basis of the vibration waveform of the vibrating plate 52. When the state within the pressure chamber 49 is abnormal, it is inferred that a nozzle 28 communicating with this pressure chamber 49 is an abnormal nozzle that suffers an ejection failure. On the basis of the vibration waveform of the pressure chamber 49, the control unit 24 may be configured to infer whether the state within the pressure chamber 49 is abnormal due to the existence of air bubbles or the state within the pressure chamber 49 is abnormal due to an increase in the viscosity of the liquid. On the basis of the vibration waveform of the pressure chamber 49, the control unit 24 may be configured to infer the total volume of air bubbles existing at the pressure chamber 49 and the nozzle 28 communicating with the pressure chamber 49 and the degree of the increase in the viscosity of the liquid at the pressure chamber 49 and the nozzle 28 communicating with the pressure chamber 49.

The frequency of the vibration waveform detected in a state where air bubbles exist in the pressure chamber 49 and the nozzle 28 that are filled with the liquid is higher than the frequency of the vibration waveform detected in a state where no air bubble exists in the pressure chamber 49 and the nozzle 28 that are filled with the liquid. The frequency of the vibration waveform detected in a state where the pressure chamber 49 and the nozzle 28 are filled with air is higher than the frequency of the vibration waveform detected in a state where air bubbles exist in the pressure chamber 49 and the nozzle 28 that are filled with the liquid. As the size of air bubbles existing in the pressure chamber 49 and the nozzle 28 that are filled with the liquid increases, the frequency of the vibration waveform increases.

The frequency of the vibration waveform detected in a state where the viscosity of the liquid increases is lower than the frequency of the vibration waveform detected in a state where the viscosity of the liquid does not increase. As the degree of the increase in the viscosity of the liquid increases, the frequency of the vibration waveform reduces. That is, the driving waveform in a case where the degree of the increase in the viscosity is small is similar to the vibration waveform in a case where foreign substances adhere at and around the opening of the nozzle 28. Thus, when a cause of an ejection failure is foreign substance at the nozzle surface 29 and when the degree of the increase in the viscosity is small, it is difficult to identify the cause of the ejection failure on the basis of the vibration waveform.

When an ejection failure is detected by the ejection-failure detecting unit 63, the control unit 24 causes the camera 21 to image a nozzle 28 for which the ejection failure is detected. Specifically, when an ejection failure is detected by the ejection-failure detecting unit 63, the control unit 24 causes the liquid ejecting head 20 to move to the first image-capturing position P1 or the second image-capturing position P2.

The control unit 24 may select which one of the first image-capturing position P1 and the second image-capturing position P2 the liquid ejecting head 20 is moved to. For example, the control unit 24 may move the liquid ejecting head 20 to an image-capturing position located closer to the position of the liquid ejecting head 20 when the ejection failure is detected. For example, the control unit 24 may move the liquid ejecting head 20 in accordance with the range of the nozzle surface 29 to be imaged. That is, for example, when the entire nozzle surface 29 is imaged, the liquid ejecting head 20 is moved to the second image-capturing position P2 to cause the second camera 21s to perform imaging. For example, when a portion of the nozzle surface 29 is imaged, the liquid ejecting head 20 is moved to the first image-capturing position P1 to cause the first camera 21f to perform imaging.

The camera 21 may image the liquid ejecting head 20 that is stopped at the image-capturing position or may image the liquid ejecting head 20 that is passing through the image-capturing position. The first camera 21f may image the liquid ejecting head 20 while moving.

When the liquid ejecting head 20 is caused to move to the first image-capturing position P1, the control unit 24 causes the first camera 21f located at the standby position to the imaging position Pi. The control unit 24 may start movement of the first camera 21f to the imaging position Pi while causing the liquid ejecting head 20 to move to the first image-capturing position P1.

The control unit 24 infers the cause of an ejection failure on the basis of a result of imaging by the camera 21. For example, when no issue exists at the nozzle surface 29, the control unit 24 may infer that the cause of the ejection failure is an increase in the viscosity of the liquid. When foreign substances attached at the nozzle surface 29 cover the nozzle 28, the control unit 24 may infer that the nozzle 28 is blocked with the foreign substance. When the end of foreign substances attached to the nozzle surface 29 is located at the nozzle 28, the control unit 24 may infer that the foreign substances are stuck in the nozzle 28.

The control unit 24 may infer the state of the liquid ejecting head 20 on the basis of a result of imaging. For example, a mist that is a liquid in a form of fine spray may be attached on the nozzle surface 29, or the liquid may spatter at and around the nozzle 28 due to the existence of air bubbles in the nozzle 28 to cause the nozzle surface 29 to get soiled. The control unit 24 may infer the presence or absence of dirt on the nozzle surface 29 on the basis of a result of imaging. The control unit 24 may infer the presence or absence of an indentation or damage at the nozzle surface 29 or the presence or absence of a mark made due to the cap 40 being brought into contact, on the basis of a result of imaging.

Next, a nozzle inspection routine will be described with reference to a flowchart illustrated in FIG. 7. The nozzle inspection routine is performed at the timing when the plurality of actuators 51 are driven.

Figure 7:
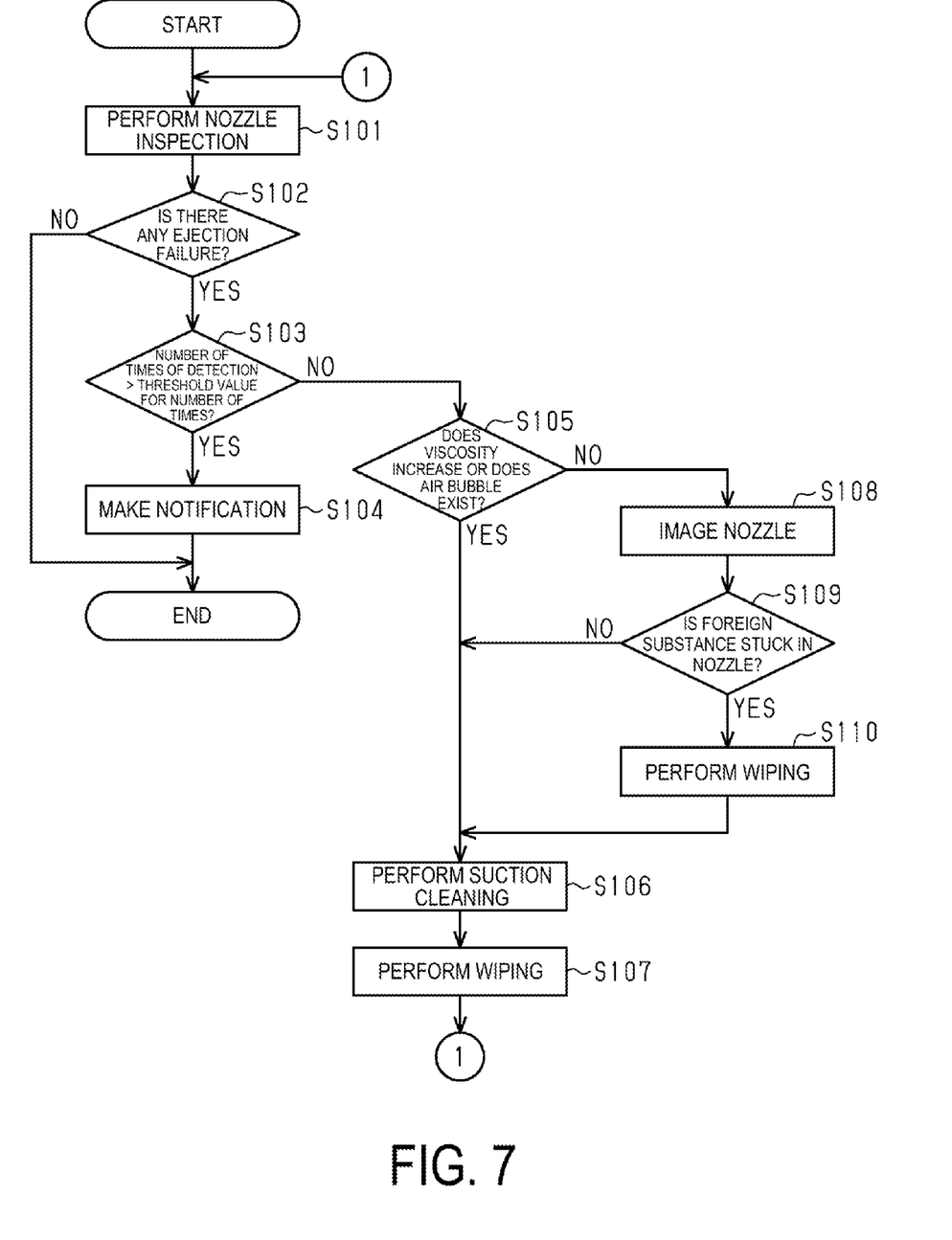
FIG. 7 is a flowchart showing a nozzle inspection routine.

As illustrated in FIG. 7, in step S101, the control unit 24 causes the ejection-failure detecting unit 63 to perform nozzle inspection. That is, the ejection-failure detecting unit 63 detects the presence or absence of an ejection failure at the plurality of nozzles 28, on the basis of the residual vibration of the vibrating plate 52.

In step S102, the control unit 24 determines whether or not an ejection failure exists in the nozzle 28. When no ejection failure exists in the nozzle 28, step S102 results in NO, and the control unit 24 ends the process. When an ejection failure exists in the nozzle 28, step S102 results in YES, and the control unit 24 cause the process to proceed to step S103.

In step S103, the control unit 24 determines whether or not the number of times of detection in which an ejection failure is detected after the nozzle inspection routine starts is more than a threshold value for the number of times. The threshold value for the number of times is one or more and is set in advance. When the number of times of detection is more than the threshold value for the number of times, step S103 results in YES, and the control unit 24 causes the process to proceed to step S104. In step S104, the control unit 24 causes the notification unit 23 to perform notification, and ends the process.

When the number of times of detection is equal to or less than the threshold value for the number of times, step S103 results in NO, and the control unit 24 causes the process to proceed to step S105. In step S105, the control unit 24 determines whether or not the cause of the ejection failure is an increase in the viscosity of the liquid or the existence of air bubbles.

When the cause of the ejection failure is identified as the increase in the viscosity of the liquid or the existence of air bubbles, step S105 results in YES, and the control unit 24 causes the process to proceed to step S106. In step S106, the control unit 24 causes the cleaning unit 38 to perform suction cleaning. In the step S107, the control unit 24 causes the wiper 37 to perform wiping. Then, the control unit 24 causes the process to proceed to step S101. In step S101, the control unit 24 may cause the liquid ejecting head 20 to perform flushing, and at the same time, perform a nozzle inspection on the basis of residual vibration associated with the flushing.

When, in step S105, the cause of the ejection failure cannot be identified as the increase in the viscosity of the liquid or the existence of air bubbles, step S105 results in NO, and the control unit 24 causes the process to proceed to step S108. In step S108, the control unit 24 causes the camera 21 to image a nozzle 28 for which the ejection failure is detected.

In step S109, the control unit 24 determines whether or not foreign substances are stuck in the nozzle 28. When foreign substances are stuck in the nozzle 28, step S109 results in YES, and the control unit 24 causes the process to proceed to step S110. In step S110, the control unit 24 causes the wiper 37 to perform wiping. Then, the control unit 24 causes the process to proceed to step S106. In step S109, for example, when foreign substances cover the nozzle 28, step S109 results in NO, and the control unit 24 causes the process to proceed to step S106.

Operation of Embodiment

Operation according to the present embodiment will be described.

The ejection-failure detecting unit 63 may detect an ejection failure on the basis of the residual vibration when a liquid is ejected for the purpose of performing printing or performing flushing. The ejection-failure detecting unit 63 may detect an ejection failure on the basis of the residual vibration when a liquid is ejected regardless of whether the ejection is performed to perform printing or perform flushing, or may detect an ejection failure on the basis of the residual vibration when the vibrating plate 52 vibrates such that a liquid is not ejected.

When an ejection failure is detected by the ejection-failure detecting unit 63, the control unit 24 causes the camera 21 to image a nozzle 28 for which the ejection failure is detected. When an ejection failure is detected during printing, the control unit 24 may cause the camera 21 to image a nozzle 28 for which the ejection failure is detected, after the printing ends. For example, the control unit 24 may cause the camera 21 to perform imaging after the end of one instruction that causes printing to be performed. The control unit 24 may cause the camera 21 to perform imaging after the end of printing to one medium 27. After the end of printing performed by the liquid ejecting head 20 with movement in one direction, the control unit 24 may cause the camera 21 to perform imaging at the time of turning around the liquid ejecting head 20. The control unit 24 may change the timing of imaging by the camera 21 according to whether or not it is possible to use another nozzle 28 to perform printing as an alternative to the nozzle 28 for which the ejection failure is detected. That is, when it is not possible to use other nozzles 28 as an alternative to perform printing, it may be possible to cause the camera 21 to perform imaging when the liquid ejecting head 20 is turned around. When it is possible to use another nozzle 28 to perform printing, it may be possible to cause the camera 21 to perform imaging after the end of one instruction.

The control unit 24 infers the cause of the ejection failure on the basis of a result of imaging, and causes at least one of maintenance and notification to be performed on the basis of the inferred cause.

When the cause of the ejection failure inferred on the basis of the result of imaging is inferred to be foreign substances that cover the nozzle 28, the control unit 24 may perform suction cleaning, wiping, and flushing as the maintenance. The control unit 24 may perform a nozzle inspection on the basis of the residual vibration of the vibrating plate 52 associated with flushing.

When the cause of the ejection failure inferred on the basis of a result of imaging is foreign substances stuck in the nozzle 28, the control unit 24 may cause wiping to be performed as maintenance and then cause suction cleaning, wiping, and flushing to be performed. The control unit 24 may perform the nozzle inspection on the basis of the residual vibration of the vibrating plate 52 associated with flushing.

When the cause cannot be eliminated even by performing the maintenance a predetermined number of times, the control unit 24 may cause the notification unit 23 to perform notification. The control unit 24 may cause the display unit 43 to perform display as the notification. The control unit 24 may cause the notification unit 23 to make notification as to at least one of the cause of the ejection failure, options concerning the maintenance, and recommended operations for eliminating the cause. The control unit 24 may make notification as to the number of nozzles 28 and the location of the nozzles 28 that have the ejection failure.

The control unit 24 may make notification of, for example, an increase in the viscosity of the liquid, the existence of air bubbles, attachment of foreign substances, damage of the nozzle 28, or the like, as the cause of the ejection failure.

The control unit 24 may make notification of at least one of suction cleaning, wiping, flushing, cleaning of the liquid ejecting head 20 by a user, cleaning of the nozzle 28 by a user, and replacement of the liquid ejecting head 20, as an option concerning the maintenance and recommended operation.

Effects of Embodiment

Effects of the present embodiment will be described.

(1) When an ejection failure is detected by the ejection-failure detecting unit 63, the control unit 24 causes the camera 21 to image a nozzle 28 for which the ejection failure is detected. Thus, when the ejection failure is caused such that the accuracy of detection by the ejection-failure detecting unit 63 is low, it is possible to infer the cause on the basis of a result of imaging by the camera 21. This makes it possible to improve the accuracy in identifying the cause, which makes it possible to take a measure suitable for the cause of the ejection failure.

(2) The ejection-failure detecting unit 63 detects the presence or absence of the ejection failure on the basis of the residual vibration of the vibrating plate 52. Thus, it is possible to simplify the configuration as compared, for example, with a case where a sensor configured to detect an ejected liquid is provided.

(3) The maintenance unit 22 includes the cleaning unit 38. The cleaning unit 38 performs cleaning in which a liquid is forcibly discharged from the liquid ejecting head 20. Thus, when the cause of the ejection failure can be removed by discharging the liquid, it is possible to cause the state of the nozzle 28 to recover by performing cleaning.

(4) The notification unit 23 includes the display unit 43. The display unit 43 displays information based on the cause of the ejection failure. Thus, it is possible to notify a user of occurrence of the ejection failure.

(5) The control unit 24 causes the notification unit 23 to make notification of the cause of the ejection failure. Thus, it is possible to notify a user of the cause of the ejection failure.

(6) The control unit 24 causes the notification unit 23 to make notification of an option concerning the maintenance. Thus, it is possible to enable a user to select the maintenance performed when an ejection failure occurs.

(7) The control unit 24 causes the notification unit 23 to make notification of a recommended operation. Thus, when an ejection failure occurs, it is possible to enable a user to easily select an operation suitable for the ejection failure.

(8) When the ejection-failure detecting unit 63 detects an ejection failure during printing, the control unit 24 causes the camera 21 to perform imaging after the end of printing. Thus, it is possible to suppress a reduction in the throughput, as compared with a case where the camera 21 is caused to perform imaging during printing.

(9) The movement unit 34 moves the camera 21. Thus, it is possible to move the camera 21 to a position where the camera can image the nozzle 28 in which the ejection failure occurs. This makes it possible to easily capture an image necessary to infer the cause of the ejection failure.

(10) The control unit 24 starts to move the first camera 21$f$ during a period of time when the liquid ejecting head 20 is moved to the first image-capturing position P1. Thus, it is possible to reduce the period of time from a time when the ejection failure is detected to a time when the first camera 21$f$ performs imaging, as compared with a case where the liquid ejecting head 20 is moved to the first image-capturing position P1 and then, movement of the first camera 21$f$ starts.

(11) When the cause of the ejection failure cannot be removed by the maintenance, the control unit 24 causes the notification unit 23 to make notification. This makes it possible to ask a user to deal with it.

MODIFICATION EXAMPLES

The present embodiment described above may be modified in the following manner and be implemented. The present embodiment and the modification examples described below may be implemented in combination within a range in which a technical contradiction does not arise.

The liquid ejecting device 11 may include an accommodating portion separately from the cap 40, the accommodating portion being configured to accommodate a liquid discharged through flushing.

The liquid ejecting device 11 may separately include a moisture-retentive cap configured to perform capping of the liquid ejecting head 20 when the liquid ejecting device 11 is at rest or is stopped, and also include a suction cap configured to perform suction cleaning.

The liquid ejecting device 11 may include a cleaning unit configured to pressurize a liquid within the liquid ejecting head 20. The cleaning unit may perform pressurized cleaning serving as one example of cleaning in which a liquid is forcibly discharged from the liquid ejecting head 20. The cap 40 may accommodate a liquid discharged from the nozzle 28 in association with the pressurized cleaning.

The cleaning unit 38 may include a valve configured to restrict flow of a liquid in the supply flow path 46 or the liquid ejecting head 20. The cleaning unit 38 may perform choke cleaning serving as one example of cleaning in which a pressure within the closed space formed by the cap 40 is reduced in a state in which the flow of a liquid is restricted, and then, the restriction of the flow of the liquid is removed to discharge the liquid in a catapult manner.

The control unit 24 may combine different cleanings to perform it. For example, the control unit 24 may be configured such that the suction cleaning is caused to be performed as the first cleaning, and the choke cleaning is caused to be performed as the second cleaning in a case where the ejection failure is not eliminated.

The control unit 24 may cause the maintenance unit 22 to perform wiping as the maintenance performed on the basis of the inferred cause. The control unit 24 may perform wiping when the cause of the ejection failure is inferred to be foreign substances on the basis of a result of imaging by the camera 21.

After the cause of the ejection failure is inferred on the basis a result of imaging by the camera 21, the control unit 24 may cause notification to be made without performing the maintenance. For example, when the liquid ejecting head 20 is in a state in which the liquid ejecting head 20 cannot recover through maintenance, the control unit 24 may ask a user to deal with it. When the liquid ejecting head 20 has an indentation, damage, or the like and is in a state of being unable to be addressed through cleaning, the control unit 24 may make notification to recommend replacing the liquid ejecting head 20.

The control unit 24 may cause the maintenance and the notification to be performed together. The control unit 24 may be configured to perform the maintenance, and make the notification that an ejection failure occurs and the notification that the maintenance is being performed.

The control unit 24 may cause the maintenance to be performed after causing the notification to be made. The control unit 24 may cause the notification of occurrence of an ejection failure to be made, and after receiving confirmation from a user, cause the maintenance to be performed.

The liquid ejecting device 11 may include a plurality of movement units 34. The movement units 34 may individually move the corresponding camera 21.

The control unit 24 may cause the liquid ejecting head 20 to be moved to the first image-capturing position P1, and then, starts to move the first camera 21*f*.

After starting to move the first camera 21*f* to the imaging position Pi, the control unit 24 may start to move the liquid ejecting head 20 to the first image-capturing position P1.

The movement direction of the camera 21 may be a direction parallel to the Z-axis. For example, when foreign substances are attached so as to droop from the nozzle surface 29, imaging is performed while moving along the Z-axis. This makes it easy to detect the foreign substances.

The control unit 24 may infer the cause of the ejection failure on the basis of a plurality of images captured by the camera 21 or may infer the cause on the basis of a portion of an image.

The ejection-failure detecting unit 63 may be a sensor configured to detect a liquid ejected from the nozzle 28. The sensor may be an electrode sensor including an electrode configured to detect that the ejected liquid is brought into contact, or may be an optical sensor using light to detect the liquid.

The liquid ejecting device 11 may be a liquid ejecting device configured to jet or eject a liquid other than ink. The state of the liquid ejected from the liquid ejecting device as a very small amount of liquid droplet includes a particle shape, a teardrop shape, and a fiber shape having a tail. For the liquid as used herein, it may be possible to use any material as long as the liquid ejecting device can eject. For example, the liquid may be any liquid phase substance, and includes a liquid body having high viscosity or low viscosity, sol, gel water, and a fluid body such as inorganic solvent, organic solvent, solution, liquid-like resin, liquid-like metal, or melted metal. The liquid not only includes a liquid as one state of a substance but also includes a substance obtained by dissolving, dispersing, or mixing, in a solvent, particles made of a functional material formed of a solid substance such as pigment or metal particle. A typical example of the liquid includes ink as described in the embodiment above, liquid crystal, or the like. Here, the ink includes various liquid compositions such as general water-based ink, oil-based ink, gel ink, or hot melt ink. A specific example of the liquid ejecting device includes a device configured to eject a liquid containing a material such as an electrode material or a color material in a state of being dispersed or dissolved, which is used in manufacturing or the like of a liquid crystal display, an electroluminescence display, a field emission display, or a color filter. The liquid ejecting device may be a device configured to eject a bioorganic material used in manufacturing a bio chip, a device used as an accurate pipette and configured to eject a liquid serving as a sample, a printing machine, a microdispenser, or the like. The liquid ejecting device may be a device configured to eject lubricant oil by pinpoint to a precision machine such as a watch or a camera, or a device configured to eject a transparent resin solution such as an ultraviolet curing resin onto a substrate so as to form a micro-hemispherical lens, an optical lens or the like used in an optical communication element. The liquid ejecting device may be a device configured to eject an etching solution such as acid or alkali so as to etch a substrate or the like.

Below, description will be made of technical ideas or operation and effect thereof obtained on the basis of the embodiment and the modification examples described above.

(A) A liquid ejecting device includes: a liquid ejecting head configured to eject a liquid from a plurality of nozzles to perform printing; a camera configured to image a nozzle surface at which the plurality of nozzles are provided; an ejection-failure detecting unit configured to detect presence or absence of an ejection failure at the plurality of nozzles; a maintenance unit configured to perform maintenance of the liquid ejecting head; a notification unit configured to perform notification; and a control unit, in which, when the ejection failure is detected by the ejection-failure detecting unit, the control unit causes the camera to image a nozzle for which the ejection failure is detected to infer a cause of the ejection failure on a basis of a result of imaging, and causes at least one of the maintenance and the notification to be performed on a basis of the inferred cause.

With this configuration, when an ejection failure is detected by the ejection-failure detecting unit, the control unit causes the camera to image a nozzle for which the ejection failure is detected. Thus, even when the ejection failure occurs such that the accuracy of detection of the cause by the ejection-failure detecting unit is low, it is possible to infer the cause on the basis of a result of imaging by the camera. This makes it possible to improve the accuracy in identifying the cause, which makes it possible to take a measure suitable for the cause of the ejection failure.

(B) The liquid ejecting device may be configured such that the liquid ejecting head includes a plurality of actuators and a vibrating plate, in which the plurality of actuators are individually driven by a driving circuit to partially displace the vibrating plate, the displaced vibrating plate causes the liquid to be ejected from a nozzle corresponding to the driven actuator, and the ejection-failure detecting unit detects presence or absence of the ejection failure at the plurality of nozzles on the basis of residual vibration of the displaced vibrating plate.

With this configuration, the ejection-failure detecting unit detects the presence or absence of an ejection failure on the basis of the residual vibration of the vibrating plate. Thus, it is possible to simplify the configuration as compared, for example, with a case where a sensor configured to detect the ejected liquid is provided.

(C) The liquid ejecting device may be configured such that the maintenance unit includes a cleaning unit configured to be able to perform cleaning in which the liquid is forcibly discharged from the liquid ejecting head, and the control unit causes the cleaning to be performed as the maintenance.

With this configuration, the maintenance unit includes the cleaning unit. The cleaning unit performs cleaning in which a liquid is forcibly discharged from the liquid ejecting head. Thus, when the cause of the ejection failure can be eliminated by discharging the liquid, it is possible to recover the state of the nozzle by performing the cleaning.

(D) The liquid ejecting device may be configured such that the notification unit includes a display unit configured to be able to display various types of information, and the control unit causes the display unit to perform display as the notification.

With this configuration, the notification unit includes the display unit. The display unit displays information based on the cause of an ejection failure. Thus, it is possible to notify a user of occurrence of the ejection failure.

(E) The liquid ejecting device may be configured such that the control unit causes the notification unit to make notification of the cause.

With this configuration, the control unit causes the notification unit to make notification of the cause of the ejection failure. Thus, it is possible to notify a user of the cause of the ejection failure.

(F) The liquid ejecting device may be configured such that the control unit causes the notification unit to make notification of an option for the maintenance.

With this configuration, the control unit causes the notification unit to make notification of an option for the maintenance. Thus, it is possible to enable a user to select the maintenance performed when an ejection failure occurs.

(G) The liquid ejecting device may be configured such that the control unit causes the notification unit to make notification of a recommended operation used to eliminate the cause.

With this configuration, the control unit causes the notification unit to make notification of a recommended operation. Thus, when an ejection failure occurs, it is possible to enable a user to easily select an operation suitable for the ejection failure.

(H) The liquid ejecting device may be configured such that, when the ejection failure is detected during printing, the control unit causes the camera to image the nozzle for which the ejection failure is detected, after the end of the printing.

With this configuration, when the ejection-failure detecting unit detects an ejection failure during printing, the control unit causes the camera to perform imaging after the end of printing. Thus, it is possible to suppress a reduction in throughput, as compared with a case where the camera is caused to perform imaging during printing.

(I) The liquid ejecting device may further include a movement unit configured to be able to move the camera.

With this configuration, the movement unit moves the camera. Thus, the camera can be moved to a position where the camera can image the nozzle in which the ejection failure occurs. This makes it possible to easily capture an image necessary to infer the cause of the ejection failure.

(J) The liquid ejecting device may be configured such that the liquid ejecting head is configured to be able to move in a scanning direction, the movement unit is configured to be able to move the camera in a movement direction differing from the scanning direction, the camera located at an imaging position is able to image the nozzle, in the liquid ejecting head, for which the ejection failure is detected, the liquid ejecting head being located at an image-capturing position, and when the ejection failure is detected by the ejection-failure detecting unit, the control unit starts to move the camera to the imaging position during a period of time when the liquid ejecting head is moved to the image-capturing position.

With this configuration, the control unit starts to move the camera during a period of time when the liquid ejecting head is moved to the image-capturing position. Thus, it is possible to reduce the period of time from a time when the ejection failure is detected to a time when the camera performs imaging, as compared with a case where the liquid ejecting head is moved to the image-capturing position and then, movement of the camera starts.

(K) The liquid ejecting device may be configured such that, when the cause cannot be eliminated even by performing the maintenance a predetermined number of times, the control unit causes the notification unit to perform the notification.

With this configuration, when the cause of the ejection failure cannot be eliminated by the maintenance, the control unit causes the notification unit to perform notification. Thus, it is possible to ask a user to deal with it.

What is claimed is:

1. A liquid ejecting device, comprising:
a liquid ejecting head configured to eject a liquid from a plurality of nozzles to perform printing;
a camera configured to image a nozzle surface at which the plurality of nozzles are provided;
an ejection-failure detecting unit configured to detect whether the plurality of nozzles have an ejection failure;
a maintenance unit configured to perform maintenance of the liquid ejecting head;
a notification unit configured to perform notification; and
a control unit, wherein,
when the ejection-failure detecting unit detects the ejection failure during the printing, the control unit causes the camera to image a nozzle of the plurality of nozzles in which the ejection failure is detected, after the printing is completed,
infers a cause of the ejection failure based on a result of the imaging, and
causes at least one of the maintenance or the notification to be performed based on the inferred cause.

2. The liquid ejecting device according to claim 1, wherein
the liquid ejecting head includes:
a plurality of actuators; and
a vibrating plate,
the plurality of actuators are individually driven by a driving circuit to partially displace the vibrating plate,
the displaced vibrating plate causes the liquid to be ejected from a nozzle corresponding to an actuator of the plurality of actuators driven by the driving circuit, and
the ejection-failure detecting unit detects, based on residual vibration of the displaced vibrating plate, whether the plurality of nozzles have the ejection failure.

3. The liquid ejecting device according to claim 1, wherein
the maintenance unit includes a cleaning unit configured to perform cleaning in which the liquid is forcibly discharged from the liquid ejecting head, and
the control unit causes the cleaning to be performed as the maintenance.

4. The liquid ejecting device according to claim 1, wherein
the notification unit includes a display unit configured to display various types of information, and
the control unit causes the display unit to perform display as the notification.

5. The liquid ejecting device according to claim 1, wherein the control unit causes the notification unit to notify the cause.

6. The liquid ejecting device according to claim 1, wherein the control unit causes the notification unit to notify options for the maintenance.

7. The liquid ejecting device according to claim 1, wherein the control unit causes the notification unit to notify a recommended operation for eliminating the cause.

8. The liquid ejecting device according to claim 1, further comprising a movement unit configured to move the camera.

9. The liquid ejecting device according to claim 8, wherein
the liquid ejecting head is configured to move in a scanning direction,
the movement unit is configured to move the camera in a movement direction different from the scanning direction,
the camera located at an imaging position is configured to image the nozzle provided at the liquid ejecting head located at an image-capturing position and having the ejection failure detected, and
when the ejection-failure detecting unit detects the ejection failure, the control unit starts to move the camera to the imaging position during when the liquid ejecting head is moved to the image-capturing position.

10. The liquid ejecting device according to claim 1, wherein, when the cause is not eliminated by performing the maintenance a predetermined number of times, the control unit causes the notification unit to perform the notification.

11. The liquid ejecting device according to claim 1, wherein the ejection-failure detecting unit detects the ejection failure without using the camera.

12. A liquid ejecting device, comprising:
a liquid ejecting head configured to:
eject a liquid from a plurality of nozzles to perform printing; and
move in a scanning direction;
a camera configured to image a nozzle surface at which the plurality of nozzles are provided;
a movement unit configured to move the camera in a movement direction different from the scanning direction;
an ejection-failure detecting unit configured to detect whether the plurality of nozzles have an ejection failure;
a maintenance unit configured to perform maintenance of the liquid ejecting head;
a notification unit configured to perform notification; and
a control unit, wherein
when the ejection-failure detecting unit detects the ejection failure, the control unit:
causes the camera to image a nozzle of the plurality of nozzles in which the ejection failure is detected,
infers a cause of the ejection failure based on a result of the imaging, and
causes at least one of the maintenance or the notification to be performed based on the inferred cause,
the camera located at an imaging position is configured to image the nozzle, at the liquid ejecting head located at an image-capturing position and, having the ejection failure detected, and
when the ejection-failure detecting unit detects the ejection failure, the control unit starts to move the camera to the imaging position during when the liquid ejecting head is moved to the image-capturing position.

* * * * *